United States Patent
PR et al.

(10) Patent No.: US 9,828,087 B2
(45) Date of Patent: Nov. 28, 2017

(54) SYSTEMS AND METHODS FOR GROUND EFFECT CEILING LIMIT DISPLAY

(71) Applicant: HONEYWELL INTERNATIONAL INC., Morris Plains, NJ (US)

(72) Inventors: Sriram PR, Tamilnadu (IN); Pushpa Basavapura Veerabhadra Reddy, Karnataka (IN); Shashidhara Veerabhadraiah, Karnataka (IN); Subash Samuthirapandian, Tamilnadu (IN); Swetha Balasa, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2 days.

(21) Appl. No.: 15/007,326

(22) Filed: Jan. 27, 2016

(65) Prior Publication Data
US 2017/0210462 A1    Jul. 27, 2017

(51) Int. Cl.
| | |
|---|---|
| *G05D 1/00* | (2006.01) |
| *G05D 1/06* | (2006.01) |
| *G05D 3/00* | (2006.01) |
| *G06F 7/00* | (2006.01) |
| *G06F 17/00* | (2006.01) |
| *B64C 27/00* | (2006.01) |
| *G08G 5/00* | (2006.01) |
| *G05D 1/04* | (2006.01) |
| *G01C 5/00* | (2006.01) |
| *G01K 13/02* | (2006.01) |

(52) U.S. Cl.
CPC ............ *B64C 27/006* (2013.01); *G01C 5/005* (2013.01); *G01K 13/028* (2013.01); *G05D 1/042* (2013.01); *G08G 5/0039* (2013.01)

(58) Field of Classification Search
CPC ...... G01C 5/005; G01K 13/028; G05D 1/042; G08G 5/0039
USPC .......................................................... 701/8
See application file for complete search history.

(56) References Cited

U.S. PATENT DOCUMENTS

| | | |
|---|---|---|
| 3,190,582 A | 6/1965 | Lippisch |
| 4,603,388 A | 7/1986 | Griffith |
| (Continued) | | |

OTHER PUBLICATIONS

Bell 407GX; 2014 Bell Helicopter Textron Inc. Bell, 206, 407, 407GX, 429, 412, Huey II, LongRanger and JetRanger are registered trademarks of Textron Innovations Inc.; Feb. 2014.

(Continued)

*Primary Examiner* — Maceeh Anwari
(74) *Attorney, Agent, or Firm* — Lorenz & Kopf, LLP (57) ABSTRACT

Systems and methods for displaying ground effect ceiling limit values associated with an operation of a mobile platform on a display are provided. The method includes receiving a preference for the display of the ground effect ceiling limit values, and determining a gross weight of the mobile platform. The method includes based on the preference, determining, with a processor, an air temperature associated with the operation of the mobile platform. The method also includes based on the gross weight and the air temperature, determining with the processor, an in ground effect limit value and an out of ground effect limit value. The method includes displaying the determined in ground effect limit value and the determined out of ground effect limit value on the display.

14 Claims, 7 Drawing Sheets

(56) References Cited

U.S. PATENT DOCUMENTS

| | | | |
|---|---|---|---|
| 4,642,775 A * | 2/1987 | Cline | G01C 23/00 |
| | | | 701/528 |
| 5,186,415 A | 2/1993 | Li | |
| 6,285,926 B1 | 9/2001 | Weiler et al. | |
| 7,031,812 B1 * | 4/2006 | Pettigrew | B64C 27/06 |
| | | | 340/945 |
| 7,091,881 B2 * | 8/2006 | Judge | G01C 23/00 |
| | | | 340/946 |
| 7,248,208 B2 | 7/2007 | Hager et al. | |
| 8,374,776 B2 | 2/2013 | Spencer | |
| 9,035,802 B2 | 5/2015 | McCollough et al. | |
| 2004/0254747 A1 | 12/2004 | Vollum | |
| 2008/0283661 A1 * | 11/2008 | Henley | B60B 19/003 |
| | | | 244/114 R |
| 2009/0138142 A1 | 5/2009 | Still et al. | |
| 2015/0150095 A1 | 5/2015 | Mere et al. | |

OTHER PUBLICATIONS

UH-1H Plus "A high performance option for the UH-1H" The Perfect Addition to your Fleet; Northwest Helicopters LLC; Product Sheet 2008.
V-22 Osprey 2010 Guidebook; Product Brochure 2010.
Langer, M.; Helicopters 101: Hover Charts, an Eclectic Mind; Nov. 29, 2013.
Extended EP Search Report for Application No. 17151280.9-1557 dated Jun. 17, 2016.

* cited by examiner

SYSTEMS AND METHODS FOR GROUND EFFECT CEILING LIMIT DISPLAY

TECHNICAL FIELD

The present disclosure generally relates to mobile platform displays, and more particularly relates to systems and methods for ground effect ceiling limit display on a display associated with an aircraft, such as a rotorcraft.

BACKGROUND

Certain mobile platforms, such as aircraft, may be influenced by ground effect when the aircraft is close to a surface, such as a ground surface or other landing surface. Generally, ground effect is the increased lift (force) and decreased aerodynamic drag that are generated by wings or rotors of an aircraft when the wings or rotors are close to a fixed surface. For example, in the case of rotorcraft, rotorcraft may have an improved hovering performance while hovering within the ground effect as the ground effect provides a vertical lift force that increases the hovering performance of the rotorcraft. Conversely, rotorcraft hovering out of the ground effect require additional power to perform the hovering operation since there is no vertical lift force. The additional power requirements necessary to perform a hover operation out of ground effect may impact a performance of the rotorcraft.

Accordingly, it is desirable to provide improved systems and methods for ground effect ceiling limit display on a display associated with a mobile platform, such as a rotorcraft, to alert pilots to the altitude limits for in ground effect and out of ground effect during the operation of the mobile platform. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method for displaying ground effect ceiling limit values associated with an operation of a mobile platform on a display. The method includes receiving a preference for the display of the ground effect ceiling limit values, and determining a gross weight of the mobile platform. The method includes based on the preference, determining, with a processor, an air temperature associated with the operation of the mobile platform. The method also includes based on the gross weight and the air temperature, determining with the processor, an in ground effect limit value and an out of ground effect limit value. The method includes displaying the determined in ground effect limit value and the determined out of ground effect limit value on the display.

Further provided according to various embodiments is a system for displaying ground effect ceiling limit values associated with an operation of a mobile platform on a display. The system includes a source of a preference for the display of the ground effect ceiling limit values on the display. The system includes a first control module that determines a gross weight of the mobile platform and based on the preference, determines an air temperature associated with the operation of the mobile platform. The system also includes a second control module that determines an in ground effect limit value and an out of ground effect limit value based on the gross weight and the air temperature and outputs the determined in ground effect limit value and the determined out of ground effect limit value for display on the display.

Also provided according to various embodiments is a method for displaying ground effect ceiling limit values associated with an operation of a rotorcraft on a display. The method includes determining a gross weight of the mobile platform based on fuel data received from a source of fuel information and a predefined initial weight of the rotorcraft. The method also includes determining, with a processor, an air temperature associated with a flight plan of the rotorcraft. The method includes based on the gross weight and the air temperature, determining, with the processor, an in ground effect limit altitude value and an out of ground effect limit altitude value. The method includes displaying the determined in ground effect limit value and the determined out of ground effect limit value on the display such that the determined in ground effect limit value and the determined out of ground effect limit value are superimposed on an altitude indicator associated with at least one of a primary flight display and a vertical situational flight display.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any suitable mobile platform, such as fixed wing aircraft, etc., and that the following description regarding a rotorcraft is merely one exemplary embodiment for displaying the ground effect ceiling limit on a display of the present disclosure. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the display system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
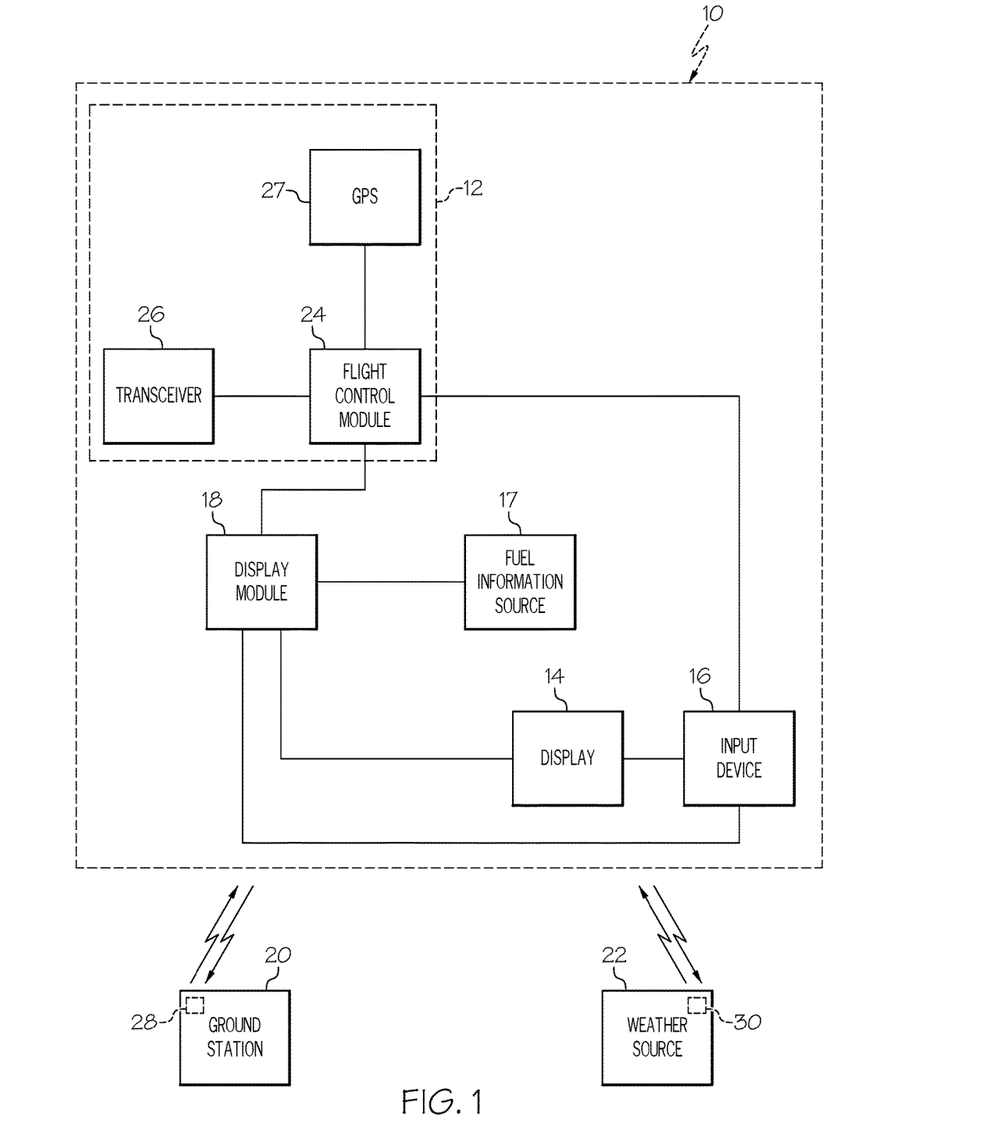
FIG. 1 is a schematic illustration of a system for ground effect ceiling limit display associated with a mobile platform in accordance with various embodiments.

With reference to FIG. 1, a mobile platform 10 is shown. In one example, the mobile platform 10 comprises a rotorcraft, however, the mobile platform 10 may comprise any mobile vehicle, such as a fixed wing aircraft, etc. In this example, the mobile platform 10 includes a flight management system 12, a display 14, an input device 16, a source of fuel information 17 and a display module 18. The mobile platform 10 is also in communication with a ground station 20 and a weather source 22. As will be discussed herein, the display module 18 receives input from the flight management system 12, the input device 16 and the weather source 22 and outputs ground effect ceiling limits for display on the display 14. Although the figures shown herein depict an example with certain arrangements of elements, additional intervening elements, devices, features, or components may be present in an actual embodiment. It should also be understood that FIG. 1 is merely illustrative and may not be drawn to scale.

The flight management system 12 generates the flight plan associated with the mobile platform 10 and manages the flight plan while in-flight as is generally known. The flight management system 12 includes a flight control module 24, including a suitable processor and memory, which generates the flight plan for the mobile platform 10 and manages the flight plan while in-flight. The flight management system 12 is in communication with the input device 16 over a suitable communication architecture or arrangement that facilitates the transfer of power, commands, data, etc., to receive input from a pilot of the mobile platform 10 to modify a flight path of the mobile platform 10. The flight management system 12 is also in communication with the ground station 20 and the weather source 22 via a transceiver 26, for example. The transceiver 26 enables two-way communications between the flight management system 12 onboard the mobile platform 10 and the ground station 20. The transceiver 26 sends and receives data, such as flight plan data for the mobile platform 10. In one example, the flight plan data may be transmitted via modulated radio frequency (RF) signals. In this example, the transceiver 26 demodulates the flight plan data for receipt by the flight control module 24. In addition, the transceiver 26 may also receive flight plan data from the flight control module 24, which has been modified by the pilot, and modulates this flight plan data for transmission to the ground station 20 (e.g. air traffic control station). It should be noted, however, that any suitable communication method could be employed to enable communication between the mobile platform 10 and the ground station 20 (e.g. air traffic control station), such as an ACARS digital datalink as known in the art. Further, it should be noted that although the transceiver 26 is illustrated as being separate from the flight control module 24, the transceiver 26 could be implemented as part of the flight control module 24, if desired.

The flight control module 24 of the flight management system 12 is also in communication with the weather source 22 via the transceiver 26, for example. The transceiver 26 sends data to the weather source 22, such as flight plan data for the mobile platform 10, and receives the weather data along the flight plan from the weather source 22. In one example, the weather data may be transmitted via modulated radio frequency (RF) signals. In this example, the transceiver 26 demodulates the weather data for receipt by the flight control module 24. In addition, the transceiver 26 may also receive flight plan data from the flight control module 24, and modulates this flight plan data for transmission to the weather source 22. It should be noted, however, that any suitable communication method could be employed to enable communication between the mobile platform 10 and the weather source 22. Further, it should be noted that the use of the transceiver 26 is merely exemplary, as the weather source 22 may be located onboard the mobile platform 10, and may comprise a radar system onboard the mobile platform 10, for example, which may be in communication with the flight control module 24 through a suitable communication architecture or arrangement that facilitates the transfer of data, commands, power, etc., such as a bus.

The flight management system 12 also includes a global positioning system (GPS) 27 as is known in the art. The global positioning system 27 provides a current global position of the mobile platform 10. The global positioning system 27 may include one or more position sensors, such as a GPS receiver, radio aids, such as scanning distance measuring equipment, VHF omnidirectional radio range (VORs), inertial reference systems (IRS). The flight management system 12 may integrate the positions obtained from the one or more position sensors of the global positioning system 27 and determine a single position of the mobile platform 10 and a corresponding accuracy of the position, as is known to one of skill in the art.

The display 14 is located onboard the mobile platform 10. The display 14 is in communication with the display module 18 to display one or more user interfaces in a graphical and/or textual format to the pilot and/or copilot of the mobile platform 10, as will be discussed in greater detail herein. While a single display 14 is illustrated herein, it will be understood that the display 14 may include any number of displays that are viewable by occupants of the mobile platform 10, including the pilot and/or copilot. The display 14 comprises any suitable technology for displaying information, including, but not limited to, a liquid crystal display (LCD), organic light emitting diode (OLED), plasma, or a cathode ray tube (CRT). The display 14 is in communication with the display module 18 over a suitable communication architecture or arrangement that facilitates transfer of data, commands, power, etc.

The input device 16 receives inputs from the pilot and/or copilot (or other occupant) of the mobile platform 10, such as a request to alter the flight plan by the flight control module 24, a preference for the display of a user interface on the display and an amount of cargo onboard the mobile platform 10, as will be discussed herein. The input device 16 may be implemented as a keyboard (not separately shown), a microphone (not separately shown), a touchscreen layer associated with the display 14, a touch pen, a number pad, a mouse, a touchpad, a roller ball, a pushbutton, a switch or other suitable device to receive data and/or commands from the pilot and/or copilot. Of course, multiple input devices 16 can also be utilized. The input device 16 is in communication with the display module 18 and the flight control module 24 over a suitable communication architecture or arrangement that facilitates transfer of data, commands, power, etc.

The source of fuel information 17 provides an indication as to the amount of fuel remaining onboard the mobile platform 10 as known to one skilled in the art. For example, the source of fuel information 17 may comprise a fuel flow rate sensor, which observes a flow rate of fuel out of a fuel tank onboard the mobile platform 10 and generates sensor signals based thereon. As a further example, the source of fuel information comprises a fuel level sensor, which observes a fuel level in the fuel tank onboard the mobile platform and generates sensor signals based thereon. The source of fuel information 17 is in communication with the display module 18 to provide an amount of fuel onboard the mobile platform 10 to the display module 18 over a suitable communication architecture or arrangement that facilitates transfer of data, commands, power, etc.

The ground station 20, such as an air traffic control station, may generate a flight path for the mobile platform 10, and may also provide the flight management system 12 with updated navigational data as is generally known. The flight path and/or navigational data may be transmitted to the mobile platform 10 via a transceiver 28 associated with the ground station 20, or via an ACARS datalink as known in the art. The transceiver 28 enables two-way communications between the flight management system 12 onboard the mobile platform 10 and the ground station 20. In one example, the flight path and/or navigational data may be transmitted via modulated radio frequency (RF) signals. It should be noted, however, that any suitable communication method could be employed to enable communication between the mobile platform 10 and the ground station 20 (e.g. air traffic control station).

The weather source 22 comprises a source of global weather data, which includes temperature data along a flight plan. The weather source 22 may comprise any suitable source of global weather data, including, but not limited to, a radar system onboard the mobile platform 10, a weather satellite, such as a SiriusXM® WX Weather Satellite, or a global weather data center. The weather source 22 may be in communication with the mobile platform 10 via a transceiver 30 associated with the weather source 22. The transceiver 30 enables two-way communications between the display module 18 onboard the mobile platform 10 and the weather source 22. The transceiver 30 sends and receives data, such as weather data, based on the flight plan for the mobile platform 10. In one example, the weather data may be transmitted via modulated radio frequency (RF) signals. In this example, the transceiver 30 receives and demodulates the flight plan data from the display module 18 for receipt by the weather source 22. In addition, the transceiver 30 modulates weather data corresponding to the flight plan for transmission to the display module 18. It should be noted, however, that any suitable communication method could be employed to enable communication between the mobile platform 10 and the weather source 22 as known to one skilled in the art.

In various embodiments, the display module 18 outputs one or more user interfaces for display on the display 14 based on weather data from the weather source 22, flight plan data from the flight control module 24 and fuel level data from the source of fuel information 17. The display module 18 also outputs the one or more user interfaces based on a preference received from the input device 16. The display module 18 outputs the one or more user interfaces based on the weather data from the weather source 22, the flight plan data from the flight control module 24, the fuel level data from the source of fuel information 17 and cargo data received from the input device 16. One or more of the user interfaces output by the display module 18 include ground ceiling limits that represent the in ground effect altitude limit value and the out of ground altitude limit value for the mobile platform 10 based on the weather data from the weather source 22, the flight plan data from the flight control module 24, the fuel level data from the source of fuel information 17, the cargo data received from the input device 16 and the preference.

Figure 2:
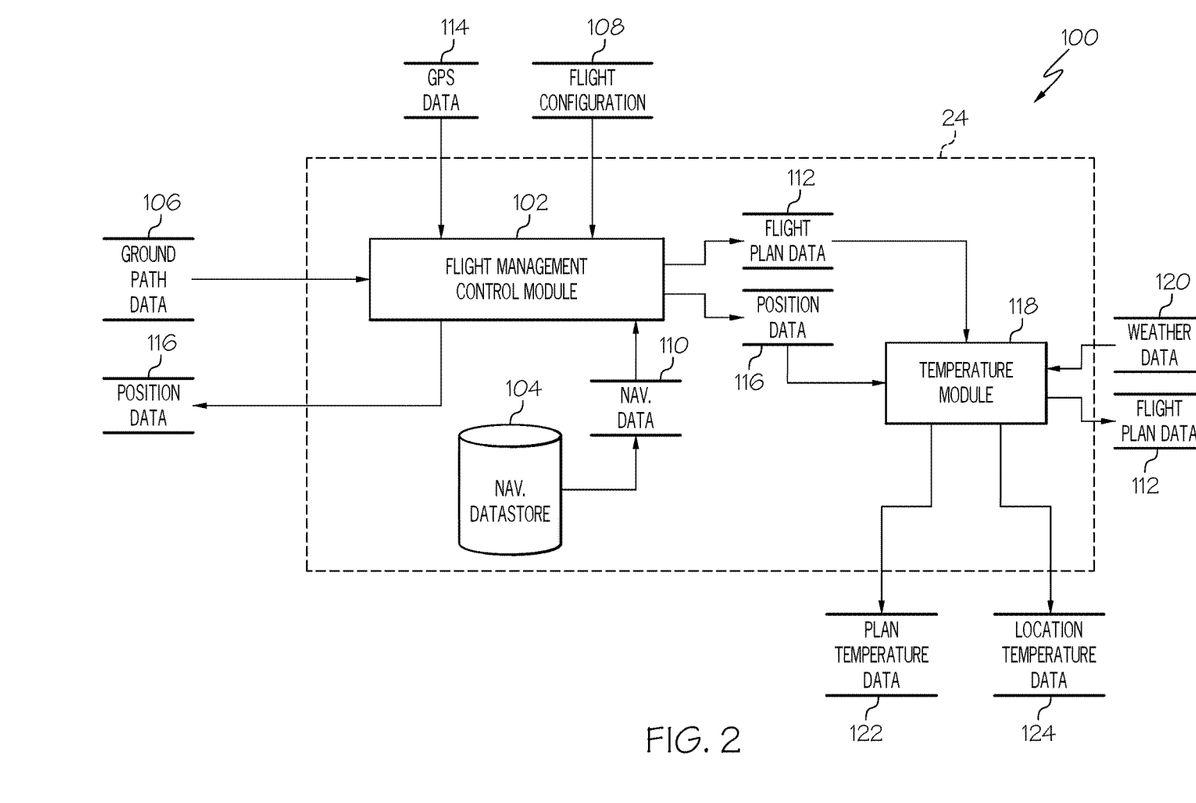
FIG. 2 is a dataflow diagram illustrating a control system of the system of FIG. 1 in accordance with various embodiments.

Referring now to FIG. 2, and with continued reference to FIG. 1, a dataflow diagram illustrates various embodiments of a control system 100 for the mobile platform 10 for the display of ground ceiling limit values, which may be embedded in the flight control module 24. Various embodiments of the control system 100 according to the present disclosure can include any number of sub-modules embedded within the flight control module 24. As can be appreciated, the sub-modules shown in FIG. 2 may be combined and/or further partitioned to similarly display the ground ceiling limit values for display on the display 14. Inputs to the control system 100 may be received from the ground station 20 (FIG. 1), received from the weather source 22, received from the source of fuel information 17, received from the input device 16, received from other control modules (not shown), and/or determined/modeled by other sub-modules (not shown) within the flight control module 24. In various embodiments, the flight control module 24 includes a flight management control module 102, a navigation datastore 104 and a temperature module 118.

The navigation datastore 104 stores the information required for building a flight plan, as is known in the art. The navigation datastore 104 may be defined via the ARINC 424 standard. The navigation datastore 104 stores waypoints/intersections, airways, radio navigations aids, airports, runways, standard instrument departure data, standard terminal arrival data, holding patterns and instrument approach procedures. The navigation datastore 104 also stores a required navigation performance (RNP) value required for a specific procedure or specific block of airspace, along with distance data in nautical miles for the flight plan. As is generally known, the RNP value is a specific value for a radius of a nautical mile that the flight management system 12 has to be able to calculate the position of the mobile platform 10 to within the specific block of airspace. For example, an RNP value of 5 indicates that the flight management system 12 has to be able to calculate the position of the mobile platform 10 within a circle with a radius of 5 nautical miles.

The flight management control module 102 receives as input ground path data 106 from the ground station 20 and a flight configuration 108 from the display module 18. The ground path data 106 comprises a flight path for the mobile platform 10 received from the ground station 20. The flight configuration 108 comprises a modification to the flight path from the pilot of the mobile platform 10, as received via the input device 16. Based on the ground path data 106 and the flight configuration 108, the flight management control module 102 generates a requested flight path for the mobile platform 10. Based on the requested flight path, the flight management control module 102 queries the navigational database and retrieves navigational data 110 associated with the requested flight path. Based on the navigational data 110, the flight management control module 102 generates flight plan data 112 and sets the flight plan data 112 for the temperature module 118. The flight plan data 112 comprises the flight plan for the mobile platform 10, constructed from the navigational data 110 and the requested flight path. The flight plan data 112 includes a distance in nautical miles for the flight plan, along with the associated RNP value from the navigational data 110.

The flight management control module 102 also receives as input GPS data 114. The GPS data 114 comprises the data received from the one or more sensors of the global positioning system 27. The flight management control module 102 determines the global position of the mobile platform 10 based on the GPS data 114 received from the one or more sensors of the global positioning system 27, and sets position data 116 for the temperature module 118 and the display module 18. The position data 116 comprises the global position of the mobile platform 10.

The temperature module 118 receives as input the flight plan data 112 from the flight management control module 102. Based on the flight plan data 112, the temperature module 118 obtains weather data 120. The weather data 120 comprises the weather associated with flight plan, which is received from the weather source 22. In the example of the weather source 22 remote from the mobile platform 10, the temperature module 118 outputs the flight plan data 112 to the weather source 22 (via the transceiver 26) and receives the corresponding weather data 120 from the weather source 22 (via the transceiver 30). In the example of the weather source 22 onboard the mobile platform 10, the temperature module 118 retrieves the weather data 120 based on the flight plan data 112 from the onboard weather source 22 over a suitable communication architecture.

Based on the weather data 120, the temperature module 118 extracts air temperature(s) based on the distance of the flight plan in nautical miles and the RNP value from the flight plan data 112 and outputs the air temperature(s) along the flight plan as plan temperature data 122. The temperature module 118 also receives as input the position data 116. Based on the position data 116 and the weather data 120, the temperature module 118 extracts an air temperature at the current position of the mobile platform 10 and outputs the air temperature data at the current position as location temperature data 124.

Figure 3:
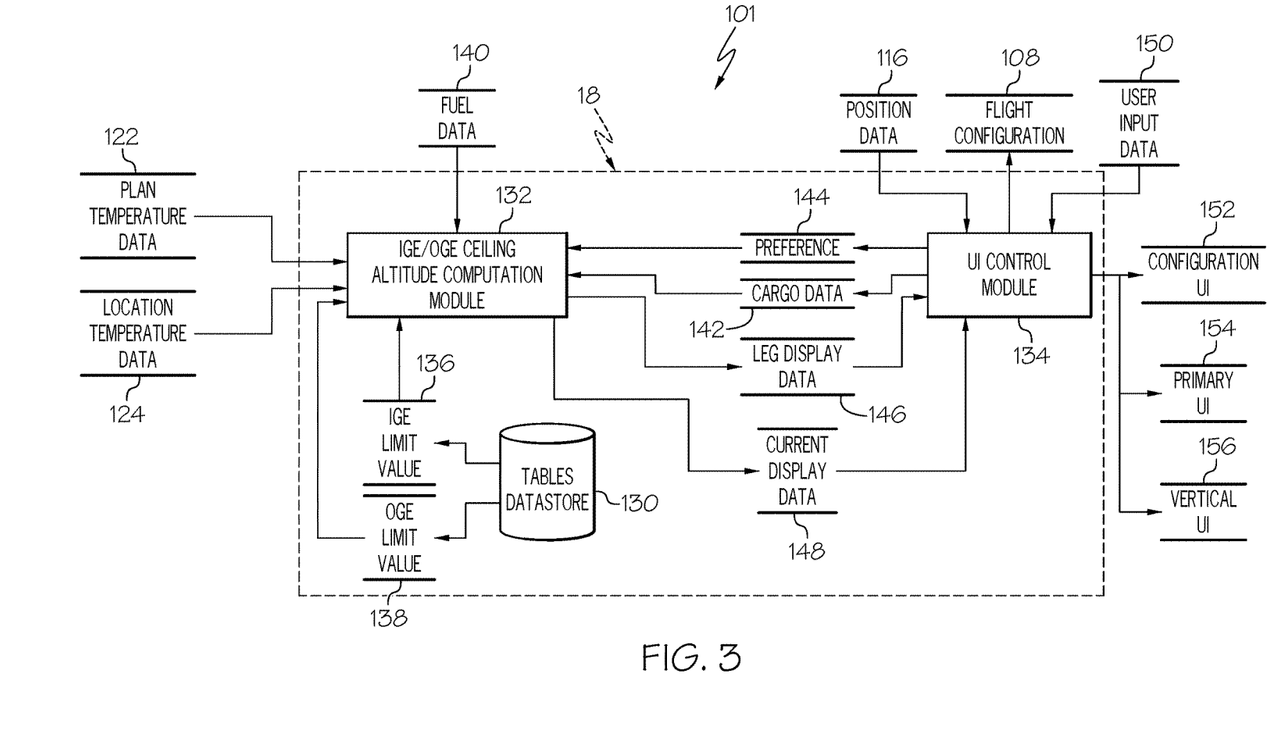
FIG. 3 is a dataflow diagram illustrating a control system of the system of FIG. 1 in accordance with various embodiments.

With reference to FIG. 3, and with continued reference to FIGS. 1-2, a dataflow diagram illustrates various embodiments of a control system 101 for the mobile platform 10 for the display of ground ceiling limit values, which may be embedded in the display module 18. Various embodiments of the control system 101 according to the present disclosure can include any number of sub-modules embedded within the display module 18. As can be appreciated, the sub-modules shown in FIG. 3 may be combined and/or further partitioned to similarly display the ground ceiling limit values for display on the display 14. Inputs to the control system 101 may be received from the ground station 20 (FIG. 1), received from the weather source 22, received from the source of fuel information 17, received from the input device 16, received from the flight control module 24, received from other control modules (not shown), and/or determined/modeled by other sub-modules (not shown) within the display module 18. In various embodiments, the display module 18 includes a tables datastore 130, a IGE/OGE ceiling altitude computation module 132 and a user interface (UI) control module 134.

The tables datastore 130 stores one or more tables (e.g., lookup tables) that indicate an in ground effect (IGE) ceiling limit altitude value and an out of ground effect (OGE) ceiling limit altitude value based on a gross weight of the mobile platform 10 and an air temperature. The one or more tables comprise calibration tables, which are acquired based on experimental data. In various embodiments, the tables may be interpolation tables that are defined by one or more indexes. An IGE limit value 136 provided by at least one of the tables indicates a ceiling limit altitude value for the mobile platform 10 to be in ground effect (IGE) based on the gross weight of the mobile platform 10 and the air temperature, and an OGE limit value 138 provided by at least one of the tables indicates a ceiling limit altitude value for the mobile platform 10 to be out of ground effect (OGE) based on the gross weight of the mobile platform 10 and the air temperature. As an example, one or more tables may be indexed by various parameters such as, but not limited to, temperature and gross weight, to provide the IGE limit value 136 and OGE limit value 138.

The IGE/OGE ceiling altitude computation module 132 receives as input fuel data 140 and cargo data 142. The fuel data 140 comprises the amount of fuel remaining onboard the mobile platform 10, based on the data provided by the source of fuel information 17. In various embodiments, the fuel data 140 may also comprise an estimated amount of fuel remaining onboard the mobile platform 10 during various positions along the flight plan. The cargo data 142 comprises a weight of cargo onboard the mobile platform 10, including passengers, crew and payload, such as luggage. Based on the fuel data 140, the cargo data 142 and a known initial weight of the mobile platform 10, the IGE/OGE ceiling altitude computation module 132 determines the gross weight of the mobile platform 10. The known initial weight of the mobile platform 10 is generally predefined or factory-set; however, the initial weight may be received as input from the input device 16.

The IGE/OGE ceiling altitude computation module 132 also receives as input the plan temperature data 122, the location temperature data 124 and a preference 144. The preference 144 comprises a preference for the display of the IGE limit value 136 and OGE limit value 138 on the display 14, which is received from the UI control module 134. For example, the preference 144 comprises a request to display the IGE limit value 136 and OGE limit value 138 for a current position of the mobile platform 10 or a request to display the IGE limit value 136 and OGE limit value 138 for the flight plan of the mobile platform 10, which is received via the input device 16.

Based on the plan temperature data 122 and the preference 144 as a request to display the IGE limit value 136 and OGE limit value 138 for the flight plan of the mobile platform 10, the IGE/OGE ceiling altitude computation module 132 determines a plurality of legs along the flight plan or separates the flight plan into a plurality of legs. Generally, the IGE/OGE ceiling altitude computation module 132 determines the plurality of legs based on temperature variations along the flight plan as indicated in the plan temperature data 122. For example, the flight plan may be segmented into legs based on a temperature variation of about positive or negative 10 degrees. Along each leg of the flight plan, based on the plan temperature data 122 and the gross weight of the mobile platform 10, the IGE/OGE ceiling altitude computation module 132 queries the tables datastore 130 and retrieves the IGE limit value 136 and OGE limit value 138. The IGE/OGE ceiling altitude computation module 132 sets the lowest of the retrieved IGE limit values 136 and OGE limit values 138 associated with the respective leg of the flight plan as leg display data 146 for the UI control module 134. Thus, for each leg of the flight plan, the IGE/OGE ceiling altitude computation module 132 determines the corresponding IGE limit values 136 and OGE limit values 138 along the leg, and sets the lowest of these retrieved values as the leg display data 146 for that leg of the flight plan to the UI control module 134.

Based on the location temperature data 124, the gross weight of the mobile platform 10 and the preference 144 as a request to display the IGE limit value 136 and OGE limit value 138 for a current position of the mobile platform 10, the IGE/OGE ceiling altitude computation module 132 queries the tables datastore 130 and retrieves the IGE limit value 136 and OGE limit value 138 for the current position of the mobile platform 10. The IGE limit value 136 and OGE limit value 138 for the current position of the mobile platform 10 is set as current display data 148 for the UI control module 134.

The user interface (UI) control module 134 receives as input user input data 150. The user input data 150 comprises one or more inputs received from the pilot and/or copilot via the input device 16. The UI control module 134 also outputs one or more textual and/or graphical interfaces for display on the display 14. For example, the UI control module 134 outputs a configuration user interface 152 that includes one or more graphical or textual indicators that enable the user to enter a configuration change to the flight plan, such as a change in a distance in nautical miles to the flight plan, a weight of the cargo onboard the mobile platform 10 and a preference for the display of the IGE limit value 136 and OGE limit value 138 on the display 14. Based on the user input data 150 to the configuration user interface 152, the UI control module 134 interprets the user input data 150 and outputs the flight configuration 108 for the flight control module 24, and sets the cargo data 142 and the preference 144 for the IGE/OGE ceiling altitude computation module 132.

The UI control module 134 also receives as input the leg display data 146 from the display module 18 and the position data 116 from the flight management control module 102. The UI control module 134 interprets the leg display data 146 and generates a primary user interface 154 and/or a vertical user interface 156 for display on the display 14, which each include a graphical and/or textual representation of the IGE limit value 136 and the OGE limit value 138 that corresponds to the current leg of the flight plan as received from the leg display data 146 based on the position of the mobile platform 10 along the flight plan from the position data 116. The UI control module 134 also receives as input the current display data 148 from the display module 18. The UI control module 134 interprets the current display data 148 and generates the primary user interface 154 and/or the vertical user interface 156 for display on the display 14, which includes a graphical and/or textual representation of the IGE limit value 136 and the OGE limit value 138 for the current location of the mobile platform 10.

Figure 4:
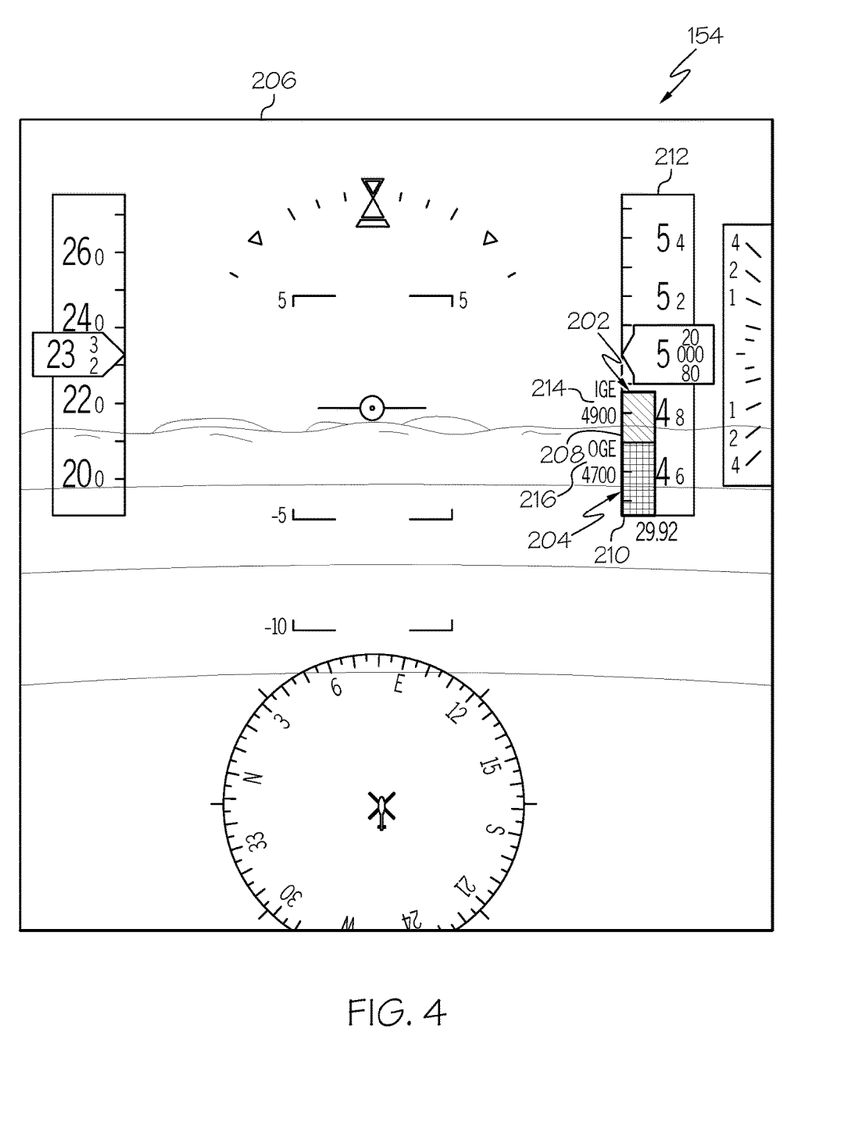
FIG. 4 is an illustration of a primary user interface, which includes the ground effect ceiling limits, for display on a display of the mobile platform of FIG. 1 in accordance with various embodiments.

With reference to FIG. 4, an exemplary primary user interface 154 is shown. The primary user interface 154 comprises an IGE ceiling limit altitude value indicator 202 and an OGE ceiling limit altitude value indicator 204 superimposed on a primary flight display 206. In this example, the IGE ceiling limit altitude value indicator 202 and the OGE ceiling limit altitude value indicator 204 comprise respective bar icons 208, 210 which are superimposed over an altitude indicator 212 associated with the primary flight display 206. In this regard, as the IGE limit value 136 comprises a ceiling limit altitude value and the altitude of the IGE limit value 136 is generally greater than the altitude of the OGE limit value 138, the bar icon 208 graphically illustrates a range of altitude values above the OGE limit value 138 in which the mobile platform 10 will be in ground effect until the IGE limit value 136 is reached. Similarly, as the OGE limit value 138 comprises a ceiling limit altitude value, the bar icon 210 graphically illustrates a range of altitude values in which the mobile platform 10 will be operating out of ground effect until the OGE limit value 138 is reached. In one example, the bar icon 208 is illustrated in a color that is different than the bar icon 210. For example, the bar icon 208 is illustrated in green and the bar icon 210 is illustrated in yellow. It will be understood that various other distinct or different colors may be employed to symbolize the range of altitude values associated with in ground effect and out of ground effect. In addition, the IGE ceiling limit altitude value indicator 202 includes a textual indicator 214, which displays in text "IGE" and the numeric value of the IGE limit value 136 to the pilot and/or copilot. The OGE ceiling limit altitude value indicator 204 also includes a textual indicator 216, which displays in text "OGE" and the numeric value of the OGE limit value 138 to the pilot and/or copilot.

Figure 5:
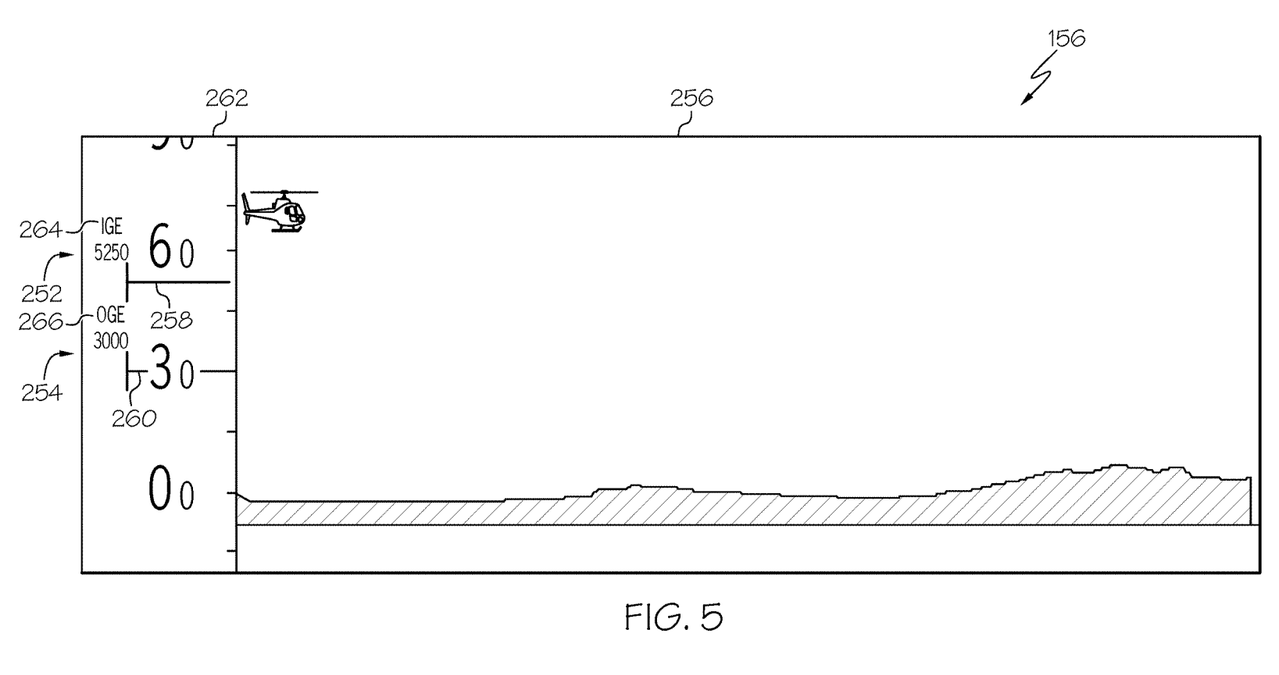
FIG. 5 is an illustration of a vertical user interface, which includes the ground effect ceiling limits, for display on the display of the mobile platform of FIG. 1 in accordance with various embodiments.

With reference to FIG. 5, an exemplary vertical user interface 156 is shown. The vertical user interface 156 comprises an IGE ceiling limit altitude value indicator 252 and an OGE ceiling limit altitude value indicator 254 superimposed on a vertical situational flight display 256. In this example, the IGE ceiling limit altitude value indicator 252 and the OGE ceiling limit altitude value indicator 254 comprise respective lines 258, 260 which are superimposed over an altitude indicator 262 associated with the vertical situational flight display 256. In this regard, the line 258 graphically illustrates the OGE limit value 138 and the line 260 graphically illustrates the OGE limit value 138. The line 258 may be in the same or a different color than the line 260. In addition, the IGE ceiling limit altitude value indicator 252 includes a textual indicator 264, which displays in text "IGE" and the numeric value of the IGE limit value 136 to the pilot and/or copilot. The OGE ceiling limit altitude value indicator 254 also includes a textual indicator 266, which displays in text "OGE" and the numeric value of the OGE limit value 138 to the pilot and/or copilot.

Figure 6:
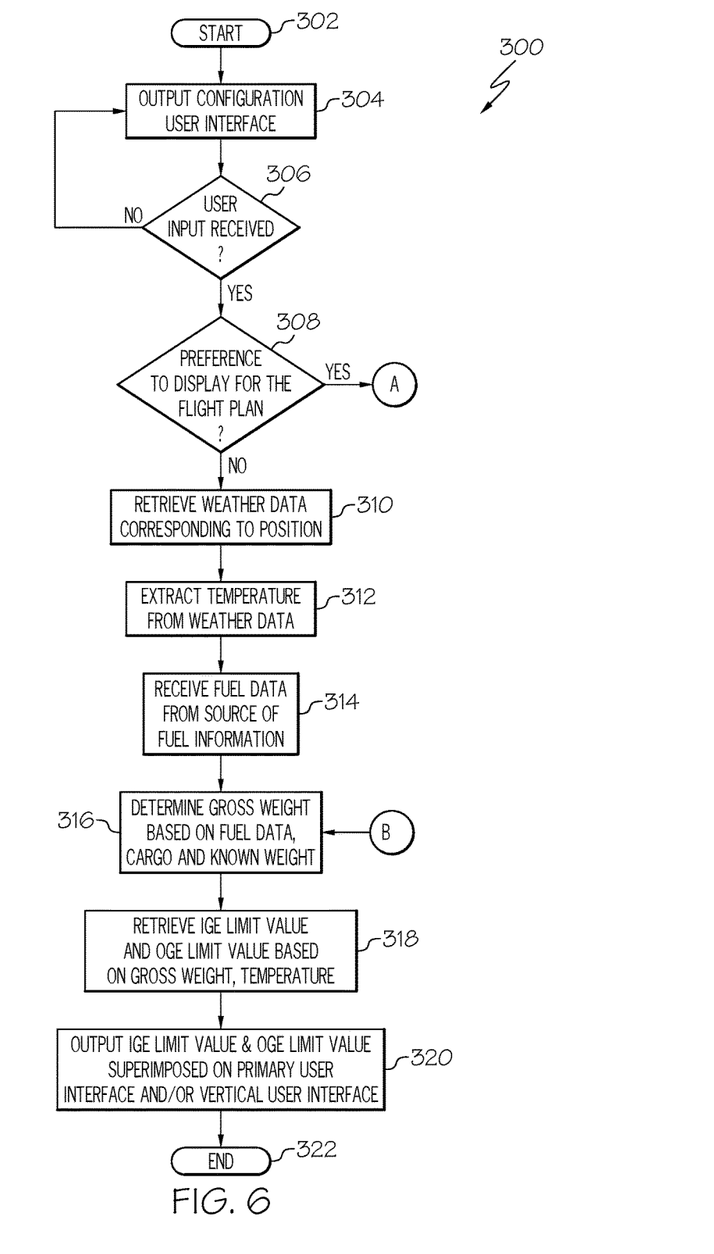
FIG. 6 is a flowchart illustrating a control method of the system of FIG. 1 in accordance with various embodiments.
Figure 7:
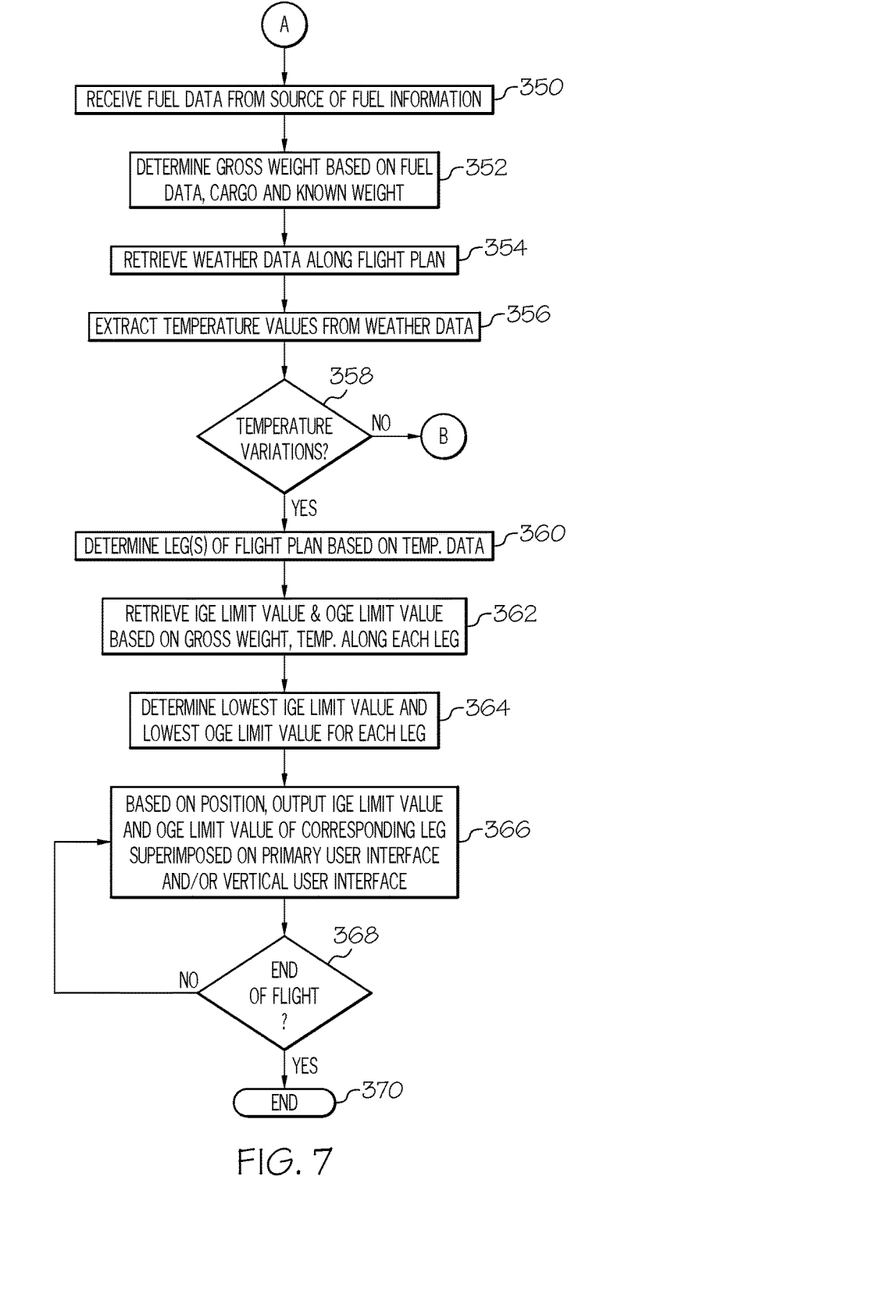
FIG. 7 is a continuation of the flowchart of FIG. 6.

Referring now to FIGS. 6-7, and with continued reference to FIGS. 1-5, a flowchart illustrates a control method that can be performed by the flight control module 24 and the display module 18 of FIGS. 1-3 in accordance with the present disclosure. As can be appreciated in light of the disclosure, the order of operation within the method is not limited to the sequential execution as illustrated in FIGS. 6-7, but may be performed in one or more varying orders as applicable and in accordance with the present disclosure.

In various embodiments, the method can be scheduled to run based on predetermined events, and/or can run based on the receipt of user input data 150.

With reference to FIG. 6, a method 300 for displaying ground effect ceiling limits is shown. The method begins at 302. At 304, the method outputs the configuration user interface 152. At 306, the method determines if user input has been received from the input device 16. If user input has been received, the method proceeds to 308. Otherwise, the method loops.

At 308, the method determines, based on the user input data 150, if the preference is a request to display ground effect ceiling limits for the flight plan. If the preference is to display the ground effect ceiling limits for the flight plan, the method proceeds to A on FIG. 7. Otherwise, at 310, the method retrieves the weather data 120 that corresponds to the position of the mobile platform 10 based on the position data 116. At 312, the method extracts the air temperature from the weather data 120 to generate the location temperature data 124. At 314, the method receives the fuel data 140 from the source of fuel information 17. At 316, the method determines the gross weight of the mobile platform 10 based on the fuel data 140, the cargo data 142 received from the user input data 150 and the predefined or known initial weight of the mobile platform 10.

At 318, the method retrieves the IGE limit value 136 and the OGE limit value 138 from the tables datastore 130 based on the gross weight of the mobile platform 10 and the location temperature data 124. At 320, the method outputs the IGE limit value 136 and the OGE limit value 138 for display on the display 14, with the IGE limit value 136 and the OGE limit value 138 superimposed on the primary user interface 154, such as the primary flight display 206 (FIG. 4), and/or on the vertical user interface 156, such as the vertical situational flight display 256 (FIG. 5). The method ends at 322. It should be noted that the method need not end at 322, but rather, the method may loop to 210 to continue to output the IGE limit value 136 and the OGE limit value 138 associated with the position of the mobile platform 10 until the mobile platform 10 arrives at its final destination, as indicated in the flight plan data 112, for example.

With reference to FIG. 7, at 350, the method receives the fuel data 140 from the source of fuel information 17. At 352, the method determines the gross weight of the mobile platform 10 based on the fuel data 140, the cargo data 142 received via the input device 16 and the predefined or known initial weight of the mobile platform 10. At 354, the method retrieves weather data 120 associated with the flight plan data 112. At 356, the method extracts the temperature values from the weather data 120 based on the distance and the RNP value of the flight plan data 112 to generate the plan temperature data 122. At 358, the method determines if there are variations in the plan temperature data 122, such as variations of about 10 degrees. If there are temperature variations, the method proceeds to 360. Otherwise, the method goes to B on FIG. 6.

At 360, the method determines one or more legs of the flight plan or separates the flight plan into one or more legs based on the plan temperature data 122. Generally, the method segments the flight plan defined in the flight plan data 112 into legs based on a temperature variation of about positive or negative 10 degrees along the flight plan. It should be noted that the variation of about 10 degrees is merely exemplary. In this regard, the temperature variation for determining segments may be user defined via user input data 150 and/or can be factory defined based on a level of accuracy desired. At 362, the method retrieves the IGE limit value 136 and OGE limit value 138 along each leg of the flight plan based on the gross weight of the mobile platform 10 and the temperature. At 364, the method determines the lowest IGE limit value 136 and the lowest OGE limit value 138 for each leg based on the retrieved IGE limit values 136 and the retrieved OGE limit values 138. At 366, the method outputs the determined lowest IGE limit value 136 and the determined lowest OGE limit value 138 superimposed on the primary user interface 154, such as the primary flight display 206 (FIG. 4), and/or on the vertical user interface 156, such as the vertical situational flight display 256 (FIG. 5), associated with the leg that corresponds to the position of the mobile platform 10 based on the position data 116. At 368, the method determines if the mobile platform 10 has arrived at a final destination based on the flight plan data 112. If the mobile platform 10 has arrived at the final destination, the method ends at 370. Otherwise, the method loops to 366.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for displaying ground effect ceiling limit values associated with an operation of a mobile platform on a display, the method comprising:

a processor configured for receiving a preference to display ground effect ceiling limit values for a flight plan associated with the mobile platform;

the processor configured for determining a gross weight of the mobile platform;

based on the preference to display ground effect ceiling limit values for the flight plan, the processor configured for determining air temperatures along the flight plan of the mobile platform;

the processor configured for determining a variation between the air temperatures along the flight plan;

the processor configured for separating the flight plan into one or more legs based on the variation between the air temperatures along the flight plan;

based on the gross weight and the air temperatures, the processor configured for determining an in ground effect limit value and an out of ground effect limit value;

the processor configured for displaying the determined in ground effect limit value and the determined out of ground effect limit value on the display, wherein:

the processor configured for determining the air temperatures along the flight plan of the mobile platform further comprises:

the processor is configured for determining the flight plan of the mobile platform that includes a distance and a required navigational performance value;

the processor is configured for retrieving weather data associated with the flight plan; and the processor is configured for extracting the air temperatures along the flight plan from the weather data based on the distance and the required navigational performance value; and based on the separating of the flight plan into one or more legs, the method further comprises:
along each leg, based on the gross weight and the air temperature, the processor is configured for determining, the in ground effect limit value and the out of ground effect limit value; and
the processor is configured for determining for each leg, a lowest in ground effect limit value from the in ground effect limit values determined along the leg and a lowest out of ground effect limit value from the out of ground effect limit values determined along the leg.

2. The method of claim 1, wherein the processor configured for receiving the preference further comprises:
the processor is configured for receiving a preference to display ground effect ceiling limit values for a current position of the mobile platform.

3. The method of claim 2, wherein based on the preference to display ground effect ceiling limit values for the current position, the processor configured for determining the air temperature associated with the operation of the mobile platform further comprises:
the processor is configured for determining the current position of the mobile platform based on global positioning system data;
the processor is configured for retrieving weather data associated with the current position; and
the processor is configured for extracting the air temperature associated with the current position from the weather data.

4. The method of claim 1, wherein the processor configured for receiving the preference further comprises:
the processor is configured for receiving the preference from an input device associated with the mobile platform.

5. The method of claim 1, further comprising:
the processor is configured for outputting the determined lowest in ground effect limit value and the determined lowest out of ground effect limit value for display on the display based on a position of the mobile platform along the flight plan.

6. A system for displaying ground effect ceiling limit values associated with an operation of a mobile platform on a display, the system comprising:
a source of a preference for the display of the ground effect ceiling limit values for a flight plan associated with the mobile platform on the display;
a first control module having a processor configured to:
determine a gross weight of the mobile platform; and
based on the preference, determine air temperatures along the flight plan of the mobile platform, the air temperatures determined based on a distance and a required navigational performance value of the flight plan and weather data associated with the flight plan, with the air temperatures along the flight plan extracted from the weather data based on the distance and the required navigational performance value;
determine a variation between the air temperatures along the flight plan;
separate the flight plan into one or more legs based on the variation between the air temperatures along the flight plan; and a second control module having a processor configured to:
determine an in ground effect limit value and an out of ground effect limit value based on the gross weight and the air temperatures; and
output the determined in ground effect limit value and the determined out of ground effect limit value for display on the display,
wherein along each leg, based on the gross weight and the air temperatures, the processor is configured to determine the in ground effect limit value and the out of ground effect limit value and to determine for each leg, a lowest in ground effect limit value from the in ground effect limit values determined along the leg and a lowest out of ground effect limit value from the out of ground effect limit values determined along the leg.

7. The system of claim 6, further comprising:
an input device, and the source of the preference comprises input received by the input device.

8. The system of claim 6, wherein the processor of the second control module is configured to output the determined in ground effect limit value and the determined out of ground effect limit value such that the determined in ground effect limit value and the determined out of ground effect limit value are superimposed onto a primary flight display displayed on the display.

9. The system of claim 8, wherein the determined in ground effect limit value is illustrated with a first bar icon having a first color and the determined out of ground effect limit value is illustrated with a second bar icon having a second color, the first color different from the second color, and the first bar icon and the second bar icon superimposed on an altitude indicator on the primary flight display.

10. The system of claim 6, wherein the processor of the second control module is configured to output the determined in ground effect limit value and the determined out of ground effect limit value such that the determined in ground effect limit value and the determined out of ground effect limit value are superimposed onto a vertical situational flight display displayed on the display.

11. The system of claim 10, wherein the determined in ground effect limit value and the determined out of ground effect limit value are superimposed on an altitude indicator on the vertical situational flight display.

12. The system of claim 6, wherein the processor of the first control module is configured to determine the gross weight of the mobile platform based on fuel data received from a source of fuel information, cargo data associated with a cargo load onboard the mobile platform and a predefined initial weight of the mobile platform.

13. A method for displaying ground effect ceiling limit values associated with an operation of a rotorcraft on a display, the method comprising:
a processor configured for determining a gross weight of the rotorcraft based on fuel data received from a source of fuel information and a predefined initial weight of the rotorcraft;
the processor configured for determining air temperatures along a flight plan of the rotorcraft;
the processor configured for determining a variation between the air temperatures along the flight plan;
the processor configured for separating the flight plan into one or more legs based on the variation between the air temperatures along the flight plan;

based on the gross weight and the air temperatures, the processor configured for determining an in ground effect limit altitude value and an out of ground effect limit altitude value; and the processor configured for displaying the determined in ground effect limit value and the determined out of ground effect limit value on the display such that the determined in ground effect limit value and the determined out of ground effect limit value are superimposed on an altitude indicator associated with at least one of a primary flight display and a vertical situational flight display, wherein:

the processor configured for determining the air temperatures along the flight plan of the rotorcraft further comprises:

the processor is configured for determining the flight plan of the rotorcraft, the flight plan including a distance and a required navigational performance value;

the processor is configured for retrieving weather data associated with the flight plan; and the processor is configured for extracting the air temperatures along the flight plan from the weather data based on the distance and the required navigational performance value; and based on the separating of the flight plan into one or more legs, the method further comprises:

along each leg, based on the gross weight and the air temperature, the processor is configured for determining the in ground effect limit value and the out of ground effect limit value;

the processor is configured for determining for each leg, a lowest in ground effect limit value from the in ground effect limit values determined along the leg and a lowest out of ground effect limit value from the out of ground effect limit values determined along the leg; and the processor is configured for superimposing the determined lowest in ground effect limit value and the determined lowest out of ground effect limit value on an altitude indicator associated with the at least one of the primary flight display and the vertical situational flight display based on a position of the rotorcraft along the flight plan.

14. The method of claim 13, further comprising the processor is configured for receiving a preference to display ground effect ceiling limit values for the flight plan associated with the rotorcraft from an input device associated with the rotorcraft, and is configured for determining the air temperature associated with the flight plan of the rotorcraft based on the preference.

* * * * *